United States Patent Office 2,816,723
Patented Dec. 17, 1957

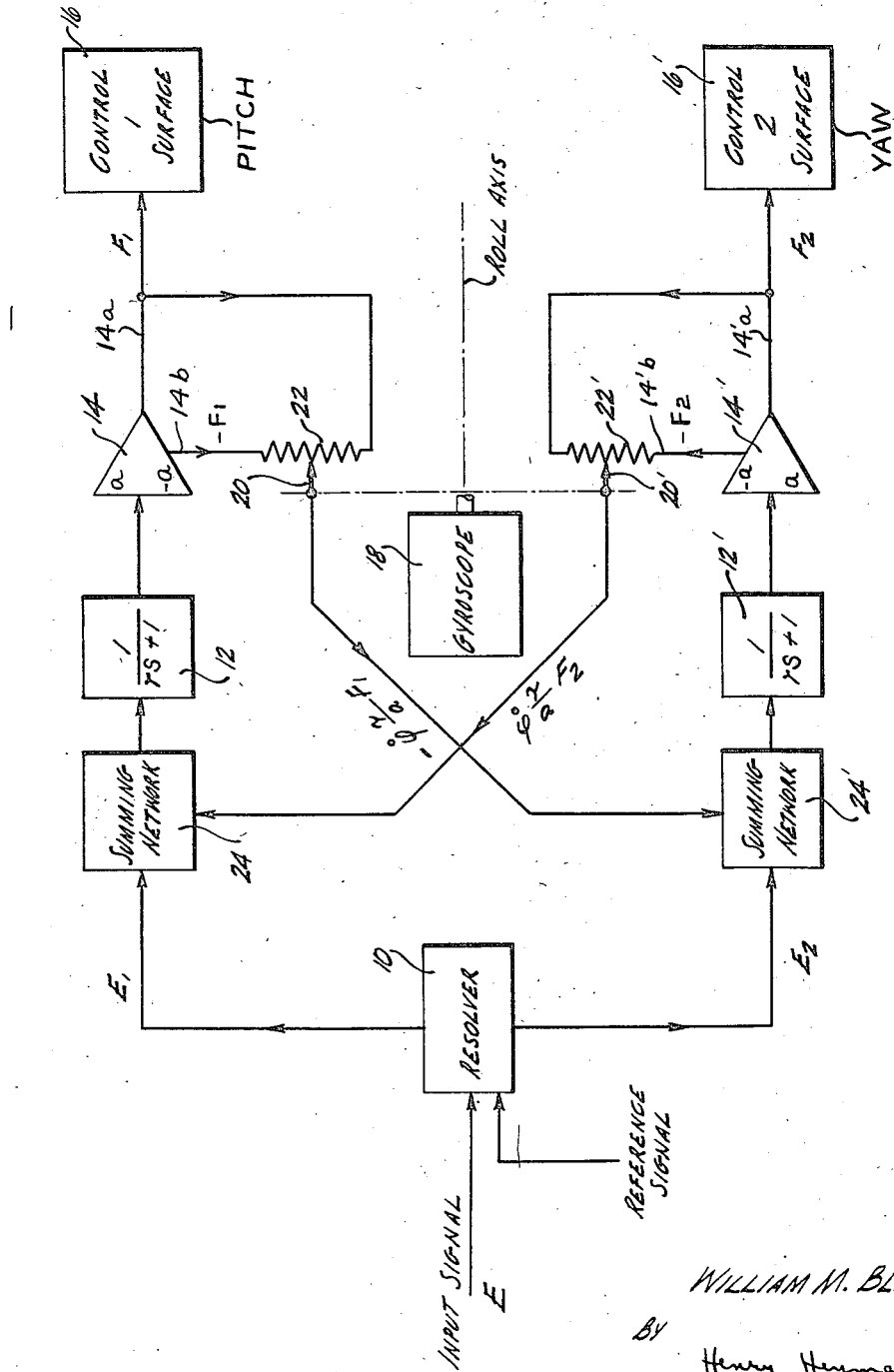

2,816,723

AIRCRAFT GUIDANCE ROLL COMPENSATOR

William M. Bleakney, Sherman Oaks, Calif., assignor to Hughes Aircraft Company, Culver City, Calif., a corporation of Delaware Application November 16, 1954, Serial No. 469,074

5 Claims. (Cl. 244—77)

This invention relates to electronic guidance and control systems for aircraft, and more particularly to a roll compensating system to compensate steering signals to be used to manipulate aerodynamic control surfaces for the effects of rolling of an aircraft housing.

In a guided aircraft, the incoming signal which contains the command information for the aerodynamic control surfaces is generally resolved into orthogonal components before it passes to actuators which effect movements of control surfaces to steer the aircraft on the predetermined course. In addition, it is generally necessary to filter the incoming signal to reduce its noise content and for smoothing; usually, at least some of this filtering is applied to the signal in its component form. If the aircraft rolls, the phase lag and the magnitude reduction in the filtered signal components in traversing the filter causes an error in the steering order which is a function of the product of the filter time constant and the roll rate.

That the roll in combination with a filter does produce an error is easily seen when regarding the filter as a momentary storage device, having a storage time equal to its time constant. Thus the steering signal is stored in the filter and released after a time corresponding to the storage time. The direction and magnitude of the signal in space coordinates are determined at the time the signal is stored. If the aircraft housing rolls between storage and release of the signal, then the released signal will effect a manipulation of the control surfaces, which have rolled with the housing and assumed a different position than they had at the time that the signal was stored. In other words, the signals are adapted to supply steering information to a reference system fixed in space, but the storage action of the filter has the effect of dragging the signal with the rotating aircraft housing so that the signal components are at rest with respect to a reference system considered as fixed in the aircraft during the storage time. This results in an error which is directly proportional to the product of the storage time and the angular velocity of the aircraft.

In order to hold this error within acceptable limits, current practice in the case of cruciform configurations which are not required to bank to turn, consists of limiting the roll rate to small values, since the storage time of the filter cannot be shortened for a given smoothing effect. This implies a small angular velocity between the reference system fixed in the aircraft and the reference system fixed in space. This is usually accomplished by means of a roll control loop comprising a roll sensitive gyroscope, aileron control on the control surfaces, and the necessary actuators and circuitry.

It is an object of this invention to provide a roll compensating system for a guided aircraft to compensate the steering system components for errors in steering orders introduced by rolling of the aircraft housing.

It is a further object of this invention to provide means to substantially eliminate roll controls for guided aircraft.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention. The scope of the invention is pointed out in the appended claims.

The invention will be described in connection with a guided missile having "pitch" and "yaw" channels to which respective steering signals are applied. Briefly, errors which occur with rolling of the missile are eliminated by cross-feeding the signals from the yaw channel to the pitch channel and vice versa. The cross-feeding consists of introducing a voltage into one channel ahead of the smoothing filter, which is directly proportional to the product of the filtered steering signal in the other channel, the filter time constant, and the roll rate of the aircraft housing. To obtain an indication of the roll rate of the aircraft housing, a roll sensitive gyroscope is pivoted in such a fashion as to move about an axis when the missile is subjected to roll. The amount of rotation about this axis is directly a function of the angular velocity of the housing. If the gyro has attached to it the arms of two potentiometers which slide along potentiometers connected to the filtered output from the signal channels, it is possible to obtain a signal out of each potentiometer which is proportional to the product of the roll rate and the filtered steering signal. This signal is then passed through an amplifier and fed into the cross channel, namely, from the yaw channel to the pitch channel and from the pitch channel to the yaw channel, and added to the steering signal before it passes to the smoothing filter. The effect of such an arrangement is to make the system independent of the roll and to supply steering information to the control surfaces as desired for a reference system fixed in space.

Referring to the drawing, in which the single figure shows a schematic block diagram of the roll guidance compensator of this invention, an input signal E carrying the guidance commands is applied to the resolver 10. Such a device, well known in the prior art, compares the phase of the input signal E with the phase of a reference signal of the same frequency and resolves the input signal E into two components $E_1$ and $E_2$. These two components are the sine and cosine components of the input signal, the angle being the phase separation between the input signal and the reference signal. The two components $E_1$ and $E_2$ are the steering signal components, which are passed through respective filters 12 and 12' and amplifiers 14 and 14' via output leads 14a and 14'a to the aerodynamic control surfaces 16 and 16'. The signal components $E_1$ and $E_2$, after having traversed the filters 12 and 12' and the amplifiers 14 and 14', are referred to as the filtered signal components $F_1$ and $F_2$.

A gyroscope 18, having a spin axis, a roll axis and a torque axis, which are mutually perpendicular, and which can be supported in the missile so that it is free to rotate about the torque axis against a spring pressure through a limited angle, is oriented so that its roll axis is along the roll axis of the missile. Attached to the gyroscope are two potentiometer wiper arms 20 and 20' which move with the gyroscope about its torque axis. The amplifiers 14 and 14' each have an additional output lead 14b and 14'b which provide an output signal equal in magnitude but opposite in polarity output signal from leads 14a and 14'a. Two potentiometers 22 and 22' are connected across the output leads 14a and 14'a, 14'b, respectively. The potentiometers 22 and 22' therefore have their midpoints at zero potential and the wiper arms 20 and 20' when making contact with their midpoints will provide zero output signals. The signals picked off the potentiometers by the respective wiper arms when positioned off the midpoints are cross-fed to the input circuits of the filters in the other channels, i. e., the output of potentiometer 22 is added to $E_2$ in a summing network 24', and the output of potentiometer 22' is added to $E_1$ in a summing network 24.

The operation of the roll guidance compensator can best be explained by resorting to an analysis of the circuit shown in the drawing. The filters 12 and 12' may be simple R–C networks having a transfer function $$\frac{1}{\tau s + 1}$$

where $\tau$ is the filter constant, and $s$=Laplace's operator.

From the drawing, the following relations are true:

$$\tau \dot{F}_1 + F_1 = aE_1 \qquad (1)$$
$$\tau \dot{F}_2 + F_2 = aE_2$$

where $a$=amplification of the filter-amplifier combination. In the absence of any roll of the missile, the coordinate system fixed in the housing and the coordinate system fixed in spaced are derived with respect to a reference system fixed in the housing, but in the absence of housing roll these equations will give the same result if transferred into a reference system fixed in space. If the housing rolls, however, such a transformation will show the introduction of an error occasioned by the storage of the signal for a time $\tau$ in the filter.

The purpose of this invention is to modify the steering signal components in such a fashion that by transforming the steering information into a reference system fixed in space by means of the roll compensating circuit shown in the drawing, the information supplied to the control surfaces will be independent of the housing roll and therefore takes the same form as Equation 1.

Let the potentiometer-gyroscope-amplifier combination shown in the drawing be such that the cross-fed signals from the two potentiometers are $$-\dot{\psi}\frac{\tau}{a}F_1 \text{ and } +\dot{\psi}\frac{\tau}{a}F_2$$

respectively. Where $\dot{\psi}$ is the angular velocity or roll rate of the housing, $\tau$ is the time constant of the filter and $a$ is the amplification.

With the added input from the potentiometer obtained by the cross-feeding, the filter inputs are now $$E_1 + \dot{\psi}\frac{\tau}{a}F_2 \text{ and } E_2 - \dot{\psi}\frac{\tau}{a}F_1$$

respectively, and the input-output relations of the filter-amplifier combination are:

$$\tau \dot{F}_1 + F_1 = aE_1 + \dot{\psi}\tau F_2 \qquad (2)$$
$$\tau \dot{F}_2 + F_2 = aE_2 - \dot{\psi}\tau F_1$$

Transforming these components into a coordinate system fixed in space by means of the well-known relations:

$$F_1 = F_1' \cos \psi + F_2' \sin \psi$$
$$F_2 = F_2' \cos \psi - F_1' \sin \psi \qquad (3)$$
$$E_1 = E_1' \cos \psi + E_2' \sin \psi$$
$$E_2 = E_2' \cos \psi - E_1' \sin \psi$$

where the primed symbols refer to the signal components in a coordinate system fixed in space. The unprimed components refer to a coordinate system fixed in the housing and the angle $\psi$ is the angle between the two coordinate systems.

Substituting Equation 3 into Equation 2 and eliminating $\psi$ yields $$\tau \dot{F}_1' + F_1' = aE_1' \qquad (4)$$
$$\tau \dot{F}_2' + F_2' = aE_2'$$

which is of the same form as Equation 1.

Thus, it is only necessary to cross-feed signals in accordance with Equation 2 by means of potentiometers controlled by a rate gyroscope in order to keep the effective plane of the control orders in the plane of the error signal, and this is done without affecting the essential filtering action of the R–C filter.

The above description is only one embodiment of this invention, and is presented to illustrate a particular application. In general, this invention is applicable to all bodies which traverse a homogeneous medium such as air or water, and which are guided in response to steering signals which exist in separate channels representing geometrically orthogonal components of the command to turn. The invention in its most general terms pertains to the compensation of the command signals in a coordinate system fixed in the body and occasioned by the smoothing and delay action of filters through which the command signals have to pass before reaching the controls. The compensation consists of cross-feeding portions of the signals from one channel to another to make the command signal independent of roll when described in a fixed coordinate system. The amount of signal cross-fed depends upon the filters characteristics and the angular velocity of the body. The criterion is that the electrical equations for the individual channels after transformation to a rotating coordinate system having the same origin as the fixed coordinate system are independent of the angular displacement and velocity of such a rotating coordinate system.

The general condition for crossfeeding in accordance with this invention may now be stated as follows. If the filter network amplifier combinations have a transfer function $G(s)$, the crossfeed signals designated as $H_1$ and $H_2$ must be such that mathematical expressions $$F_1 = G(s)[E_1 + H_1] \qquad (5)$$
$$F_2 = G(s)[E_2 + H_2]$$

are reduced to $$F_1' = G(s)E_1' \qquad (6)$$
$$F_2' = G(s)E_2'$$

by the relations of Equation 3.

The invention is not confined to any particular means for attaining the steering function from the command signals. One common means is the direct application of the separate channel outputs to orthogonal control surfaces on missiles having a cruciform configuration. In this application, the invention provides a means for eliminating roll control without sacrificing the advantages of smoothing filters.

A second common means for attaining the steering function is to apply the output of one channel to one control surface, termed the elevator, and the output of the other channel to ailerons which roll the aircraft until this channel output is zero. Thus, one channel is used solely to control the direction of the steering response, and the other to control its magnitude and sign. This method is widely used in manned airplanes, and the invention permits the filtering of steering signals in automatic fire control systems, for example, without introducing errors which arise from the rolling response which itself is produced by the steering signals and cannot be avoided.

The invention, in a general way, describes a procedure for operating on two electrical signals which have significance as the orthogonal components of a vector in a plane in space, such that filtering is accomplished in the presence of arbitrary rotation of the housing about an axis normal to that plane as though the rotation did not exist.

What is claimed is:

1. In an aircraft housing equipped with a pitch and yaw set of control surfaces, and containing an electronic guidance system adapted to develop pitch and yaw signals which represent information referenced to a rectangular coordinate system of said housing to be utilized to operate said pitch and yaw control surfaces, wherein said aircraft housing is free to rotate during flight, and wherein said pitch and yaw signals are to be transmitted respectively to said pitch and yaw control surfaces by a pitch and yaw signal channel which contains respective filter networks to smooth and delay the said signals a predetermined amount, a system to compensate for rolling of the housing and prevent improper operation of said control surfaces as a result of roll comprising: a gyroscope coupled to said aircraft housing, said gyroscope being adapted to rotate through a predetermined angle, the angle of rotation being proportional to the absolute magnitude of the angular velocity of said housing and the direction of rotation depending on the direction of roll, a pitch and yaw potentiometer adapted to receive voltages corresponding to the smoothed and delayed pitch and yaw signals, said pitch and yaw potentiometers having sliding contacts in fixed spaced relation to said gyroscope, a pitch and yaw cross-feeding circuit coupled to said potentiometer arms and connected respectively to said yaw and pitch signal channels at a point ahead of said filter networks, whereby signals representative of the voltages across said pitch and yaw potentiometers are fed to said yaw and pitch signal channels, respectively, to compensate said pitch and yaw signal for the delay suffered in traversing said pitch and yaw filter network when said housing rolls, thereby to present signals for operation of said pitch and yaw control surfaces which are independent of housing roll.

2. The invention as described in claim 1 wherein said filter network has a transfer characteristic $$\frac{a}{s\tau+1}$$

where $a$ is the amplification, $\tau$ is the filter time constant and $s$ is the Laplace operator, and where the voltages cross-fed are $$\pm \dot{\psi}\frac{\tau}{a}F_1, \mp \dot{\psi}\frac{\tau}{a}F_2$$

where $\dot{\psi}$ is the roll rate of the aircraft housing and F is the smoothed and delayed filter output with cross-feeding applied.

3. In an aircraft housing equipped with pitch and yaw aerodynamic control surfaces, and containing an electronic guidance system adapted to develop pitch and yaw signals which represent information referenced to a rectangular coordinate system of said housing to be utilized to operate said pitch and yaw aerodynamic control surfaces, wherein said aircraft housing is free to rotate during flight, a system to compensate for rolling of the housing and to prevent improper operation of said aerodynamic control surfaces as a result of roll comprising: a pitch signal channel to receive said pitch signals, a yaw signal channel to receive said yaw signals, pitch and yaw filter networks in the respective pitch and yaw channels to smooth and delay said signals a predetermined amount, a gyroscope, said gyroscope being supported in said housing, said gyroscope being free to rotate through a small angle, the angle of rotation of said gyroscope being proportional to the absolute magnitude of the angular velocity of said housing and the direction of rotation depending on the direction of roll, a pitch and yaw potentiometer respectively adapted to receive voltages corresponding to the smoothed and delayed pitch and yaw signals, said pitch and yaw potentiometers having sliding contacts in fixed spaced relation to said gyroscope so that rotation of said gyroscope changes the position of said sliding contacts, a pitch and yaw cross-feeding circuit coupled to the sliding contacts of said pitch and yaw potentiometers and connected respectively to said second and first signal channels at a point, whereby signals representative of the voltages across said pitch and yaw potentiometers are fed to said yaw and pitch signal channels respectively to compensate said pitch and yaw signal for the delay suffered in traversing said pitch and yaw filter network when said housing rolls, whereby signals are available to manipulate said pitch and yaw control surfaces which are independent of housing roll.

4. In an aircraft housing equipped with pitch and yaw control surfaces, and containing an electronic guidance system adapted to develop pitch and yaw signals which represent information referenced to a rectangular coordinate system of said housing to be utilized to operate said pitch and yaw control surfaces, and wherein said pitch and yaw signals are to be transmitted respectively through a pitch and yaw signal channel to effect manipulation of said control surfaces to steer said housing, wherein said pitch and yaw signal channel having a pitch and a yaw filter network to smooth and delay the said signals a predetermined amount, a system to compensate for rolling of the housing and prevent improper operation of said control surfaces as a result of roll, a cross-feeding system, said system comprising means for developing and inserting a first compensating signal into the input of said pitch filter network which is a function of the output of said yaw filter network and the roll rate of said housing and a yaw compensating signal into the input of said yaw filter network which is a function of the output of said pitch filter network and the roll rate of said housing in accordance with the relations:

$$F_1 = G(s)[E_1 + H_1]$$
$$F_2 = G(s)[E_2 + H_2]$$

where $F_1$ and $F_2$ are the output of the smoothing filter, $E_1$ and $E_2$ are the signal components before entering the smoothing filter, $G(s)$ is the transfer function of the smoothing filter, and $H_1$ and $H_2$ are compensating signals added to the signal components before entering the smoothing filter, where all F's and E's are referred to a coordinate system fixed in said housing; then $$F_1' = G(s)E_1'$$
$$F_2' = G(s)E_2'$$

where the primed symbols refer to a coordinate system fixed in space and are related to the coordinate system fixed in the housing by the following set of equations:

$$F_1 = F_1' \cos \psi + F_2' \sin \psi$$
$$F_2 = F_2' \cos \psi - F_1' \sin \psi$$
$$E_1 = E_1' \cos \psi + E_2' \sin \psi$$
$$E_2 = E_2' \cos \psi - E_1' \sin \psi$$

where $\psi$ is the angle between said coordinate systems and $\dot{\psi}$ in the roll rate of said housing.

5. The invention of claim 4 wherein said cross-feeding system incorporates a gyroscope, said gyroscope being adapted to be supported in said housing, for freedom of rotation through a small angle, the angle of rotation of said gyroscope being proportional to the absolute magnitude of the angular velocity of said housing and the direction of rotation depending on the direction of roll, and means coupled to said gyroscope and responsive to the rotation of said gyroscope to cause said compensating signals to be also proportional to the angular velocity of said housing.

References Cited in the file of this patent

UNITED STATES PATENTS

| | | |
|---|---|---|
| 2,531,188 | Yates | Nov. 21, 1950 |
| 2,555,019 | Webb | May 29, 1951 |

UNITED STATES PATENT OFFICE

Certificate of Correction

Patent No. 2,816,723 December 17, 1957

William M. Bleakney

It is hereby certified that error appears in the printed specification of the above numbered patent requiring correction and that the said Letters Patent should be read as corrected below.

Column 2, line 71, after "14a" insert —, 14b—; column 4, line 30, for "filters" read —filter—; column 5, line 51, for "$\psi$" read —$\dot{\psi}$—.

Signed and sealed this 4th day of March 1958.

[SEAL]

Attest:
KARL H. AXLINE,
*Attesting Officer.*

ROBERT C. WATSON,
*Commissioner of Patents.*